(12) United States Patent
Ueno et al.

(10) Patent No.: US 12,395,322 B2
(45) Date of Patent: Aug. 19, 2025

(54) ENCRYPTION APPARATUS, CYPHER COMMUNICATION SYSTEM, ENCRYPTION METHOD AND PROGRAM

(71) Applicant: NIPPON TELEGRAPH AND TELEPHONE CORPORATION, Tokyo (JP)

(72) Inventors: Mana Ueno, Tokyo (JP); Tetsutaro Kobayashi, Tokyo (JP); Keizo Murakami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 173 days.

(21) Appl. No.: 18/258,932

(22) PCT Filed: Jan. 14, 2021

(86) PCT No.: PCT/JP2021/001112
§ 371 (c)(1),
(2) Date: Jun. 22, 2023

(87) PCT Pub. No.: WO2022/153456
PCT Pub. Date: Jul. 21, 2022

(65) Prior Publication Data
US 2024/0048362 A1    Feb. 8, 2024

(51) Int. Cl.
*H04L 9/08* (2006.01)

(52) U.S. Cl.
CPC .......... *H04L 9/0825* (2013.01); *H04L 9/0844* (2013.01); *H04L 9/0894* (2013.01)

(58) Field of Classification Search
CPC .... H04L 9/0825; H04L 9/0844; H04L 9/0894
USPC .......................................................... 713/171
See application file for complete search history.

(56) References Cited

U.S. PATENT DOCUMENTS

| | | | | |
|---|---|---|---|---|
| 6,085,320 | A * | 7/2000 | Kaliski, Jr. ........... | G07F 7/1008 713/168 |
| 7,373,509 | B2 * | 5/2008 | Aissi ..................... | H04L 9/3247 713/168 |
| 7,587,590 | B2 * | 9/2009 | Yamada .................. | H04L 9/003 713/153 |
| 8,015,393 | B2 * | 9/2011 | Fukasawa ............. | H04L 9/3263 713/168 |
| 8,291,231 | B2 * | 10/2012 | Ueno ...................... | H04L 9/321 713/168 |

(Continued)

FOREIGN PATENT DOCUMENTS

| | | | | |
|---|---|---|---|---|
| EP | 3096487 B1 * | 4/2020 | .......... | H04L 9/0825 |
| JP | 2000-132096 | 5/2000 | | |

(Continued)

OTHER PUBLICATIONS

Daisuke Moriyama, Ryo Nishimaki, Tatsuaki Okamoto, "Koukaikagiango no suri (Mathematics of public key encryption)", Kyoritsu Shuppan Co., Ltd., 2011, p. 147-154.

(Continued)

*Primary Examiner* — Samson B Lemma
(74) *Attorney, Agent, or Firm* — IPUSA, PLLC

(57) ABSTRACT

An encryption apparatus including a key storage unit that stores a secret key and a public key of public key encryption, and an encryption unit that encrypts communication data using the secret key and the public key.

7 Claims, 11 Drawing Sheets

(56) References Cited

U.S. PATENT DOCUMENTS

| | | | | |
|---|---|---|---|---|
| 11,018,847 | B2* | 5/2021 | Hunacek | H04L 9/0662 |
| 2004/0059908 | A1* | 3/2004 | Yamada | H04L 9/003 |
| | | | | 713/151 |
| 2004/0208317 | A1 | 10/2004 | Imai et al. | |
| 2004/0246350 | A1* | 12/2004 | Sakamoto | G06T 5/92 |
| | | | | 348/241 |
| 2005/0002532 | A1* | 1/2005 | Zhou | H04L 9/302 |
| | | | | 380/277 |
| 2005/0078825 | A1* | 4/2005 | Ohmori | H04N 21/835 |
| | | | | 380/255 |
| 2005/0228986 | A1* | 10/2005 | Fukasawa | H04L 9/3263 |
| | | | | 713/156 |
| 2008/0189548 | A1* | 8/2008 | Steeves | G06F 21/602 |
| | | | | 726/25 |
| 2011/0293098 | A1* | 12/2011 | Fu | H04L 9/321 |
| | | | | 709/206 |
| 2015/0222422 | A1* | 8/2015 | Yung | H04L 9/30 |
| | | | | 380/30 |
| 2016/0294551 | A1* | 10/2016 | Ichikawa | H04L 9/0861 |
| 2017/0019385 | A1* | 1/2017 | Yoo | H04L 63/062 |
| 2019/0394018 | A1 | 12/2019 | Isshiki et al. | |
| 2022/0167156 | A1 | 5/2022 | Yasui | |

FOREIGN PATENT DOCUMENTS

| | | | |
|---|---|---|---|
| JP | 2004-246350 | 9/2004 | |
| JP | 2017-506362 | 3/2017 | |
| WO | WO-2016091790 A1 * | 6/2016 | H04L 9/0838 |
| WO | 2018/100740 | 6/2018 | |
| WO | 2020/188679 | 9/2020 | |

OTHER PUBLICATIONS

Emura, K., Hanaoka, G., Nuida, K et al. Chosen ciphertext secure keyed-homomorphic public-key cryptosystems. Des. Codes Cryptogr. 86, 1623-1683 (2018). https://doi.org/10.1007/s10623-017-0417-6.

* cited by examiner

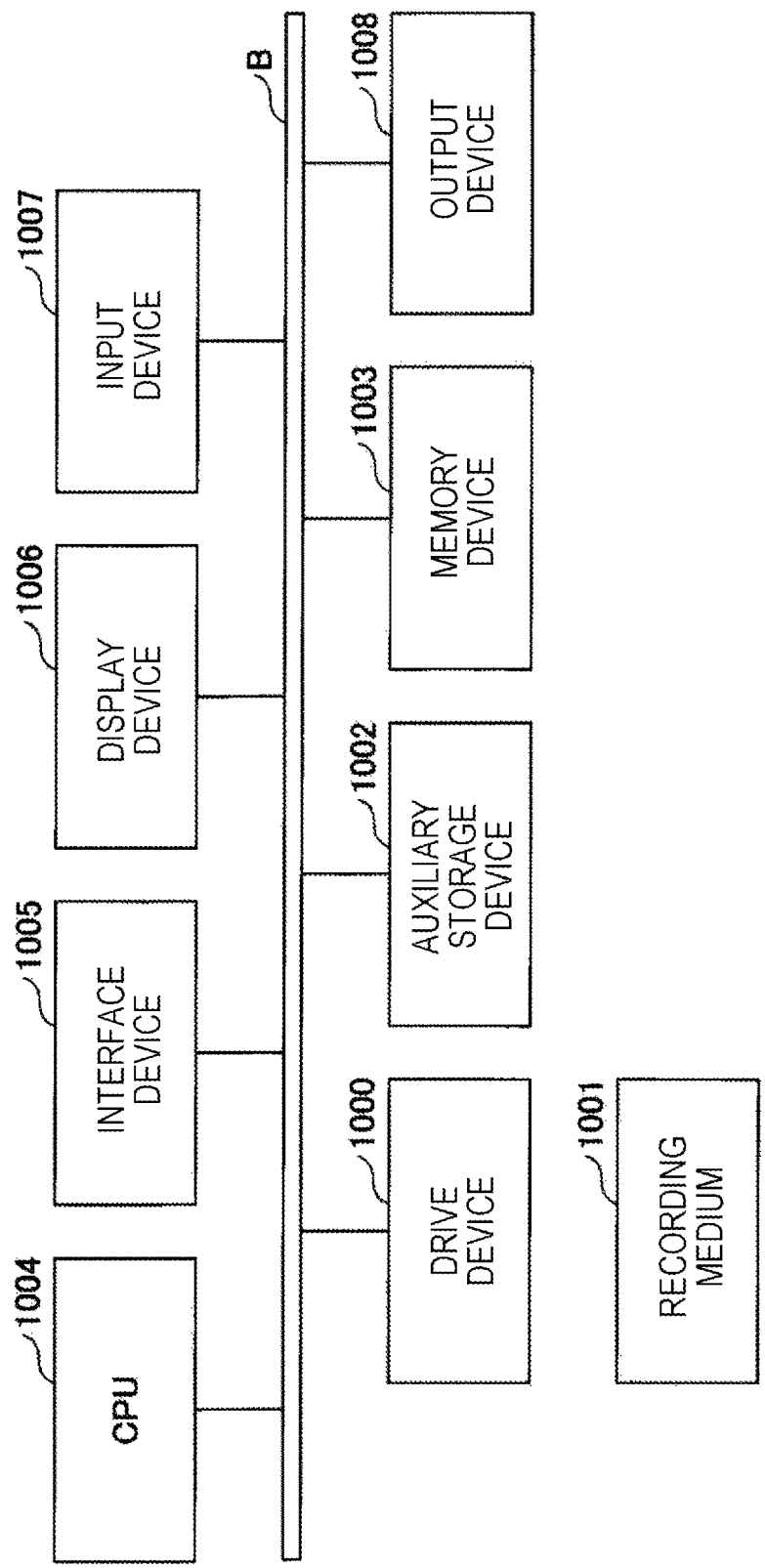

ENCRYPTION APPARATUS, CYPHER COMMUNICATION SYSTEM, ENCRYPTION METHOD AND PROGRAM

TECHNICAL FIELD

The present invention relates to an encryption apparatus, a cypher communication system, an encryption method, and a program.

BACKGROUND ART

As a method of encrypting communication contents in online data communication, two encryption methods of common key encryption and public key encryption are known. In addition, hybrid encryption combining two encryption methods is known.

For example, Non Patent Literature 1 discloses a method in which communication contents are encrypted by common key encryption and a key used in common key encryption is encrypted by public key encryption. This method is a method addressing the fact that encryption and decryption processing in public key encryption is very slow compared with those in common key encryption.

Specifically, in this method, communication data is encrypted by using high-speed common key encryption to be repeated the number of times corresponding to the length of the communication data, and the key to be delivered is encrypted by using public key encryption in order to solve the key delivery problem that occurs in common key encryption.

CITATION LIST

Non Patent Literature

Non Patent Literature 1: Daisuke Moriyama, Ryo Nishimaki, Tatsuaki Okamoto, "Koukaikagiango no suri (Mathematics of public key encryption)", Kyoritsu Shuppan Co., Ltd., 2011, p. 147-154

SUMMARY OF INVENTION

Technical Problem

In an online conference system, in order to perform communication in a small communication band, there is a system in which data such as voice collected from each terminal is synthesized (added) by a service providing server and transmitted to each terminal. In addition, there is a demand for a service provider to achieve end-to-end cryptographic communication for concealing communication contents.

In order to perform processing such as addition of encrypted communication contents, it is conceivable that the service providing server once converts the contents into plain text. However, in that case, the communication contents cannot be concealed from the service provider, and end-to-end cryptographic communication cannot be achieved.

Therefore, complete end-to-end encryption that conceals communication contents from the service provider as well is achieved by using special homomorphic encryption that enables addition on the server in the encrypted state. In addition, it has been found in previous studies that homomorphism is in public key encryption typified by ElGamal encryption or the like.

As described above, depending on the use purpose of cryptographic communication, not only the delivered key but also the communication data needs to be encrypted using public key encryption instead of common key encryption as in Non Patent Literature 1.

However, encryption processing in conventional public key encryption is very slow, and there is a problem that it cannot be used for processing in real-time communication such as a video conference system.

An object of the disclosed technology is to speed up encryption processing using public key encryption.

Solution to Problem

The disclosed technology is an encryption device including a key storage unit that stores a secret key and a public key of public key encryption, and an encryption unit that encrypts communication data using the secret key and the public key.

Advantageous Effects of Invention

Encryption processing using public key encryption can be speeded up.

BRIEF DESCRIPTION OF DRAWINGS

FIG. 11 is a diagram illustrating a hardware configuration example of each device.

DESCRIPTION OF EMBODIMENTS

Hereinafter, embodiments of the present invention will be described with reference to the drawings. The embodiments described below are merely examples, and embodiments to which the present invention is applied are not limited to the following embodiments.

Before describing the technology according to the present embodiment, first, conventional technology related to cryptography of the present embodiment and a problem thereof will be described.

(Conventional Technology)

Conventional public key encryption will be described with reference to FIG. 1.

Figure 1:
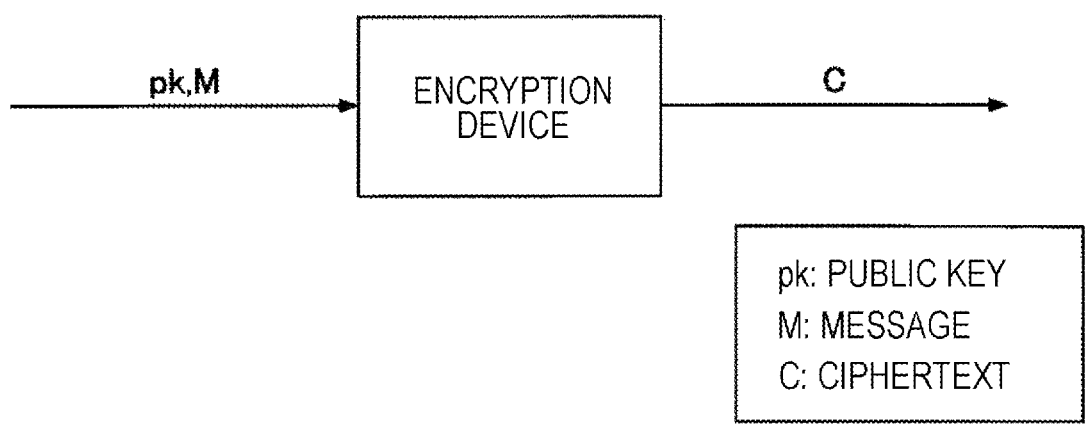
FIG. 1 is a diagram for describing an encryption device in conventional public key encryption.

As illustrated in FIG. 1, when receiving input of a message M and a public key pk, a conventional encryption device encrypts the message M using the public key pk and outputs a ciphertext C.

However, encryption processing using the public key pk requires time to perform calculation, and thus is not suitable for cryptographic communication requiring real-time properties such as a video conference system.

Hereinafter, a technology according to the present embodiment for solving the above problem will be described.

Outline of Present Embodiment

Figure 2:
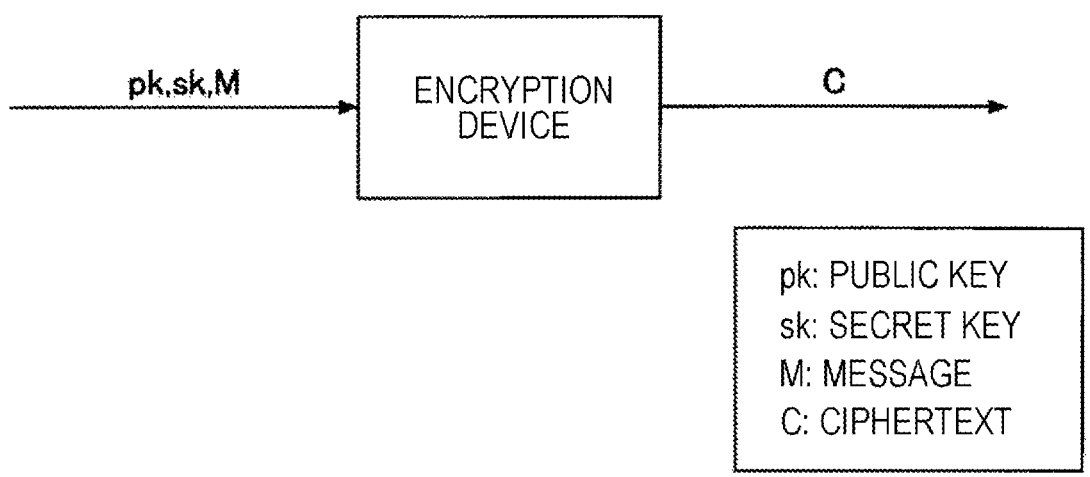
FIG. 2 is a diagram for describing an encryption device in public key encryption according to an embodiment of the present invention.

First, an outline of a technology according to the present embodiment will be described. FIG. 2 is a diagram for describing an encryption device in public key encryption according to the present embodiment.

In the encryption method according to the present embodiment, as illustrated in FIG. 2, when receiving input of a message M, a public key pk, and a secret key sk, the encryption device encrypts the message M using the public key pk and the secret key sk, and outputs a ciphertext C. That is, the encryption device uses not only the public key pk but also the secret key sk in the encryption process, which is different from the conventional technology. Note that the message M is an example of communication data in cryptographic communication. In addition, the ciphertext C is an example of encrypted communication data.

Embodiment 1

Hereinafter, Embodiment 1 of the present invention will be described with reference to the drawings. The embodiments described below are merely examples, and embodiments to which the present invention is applied are not limited to the following embodiments.

Figure 3:
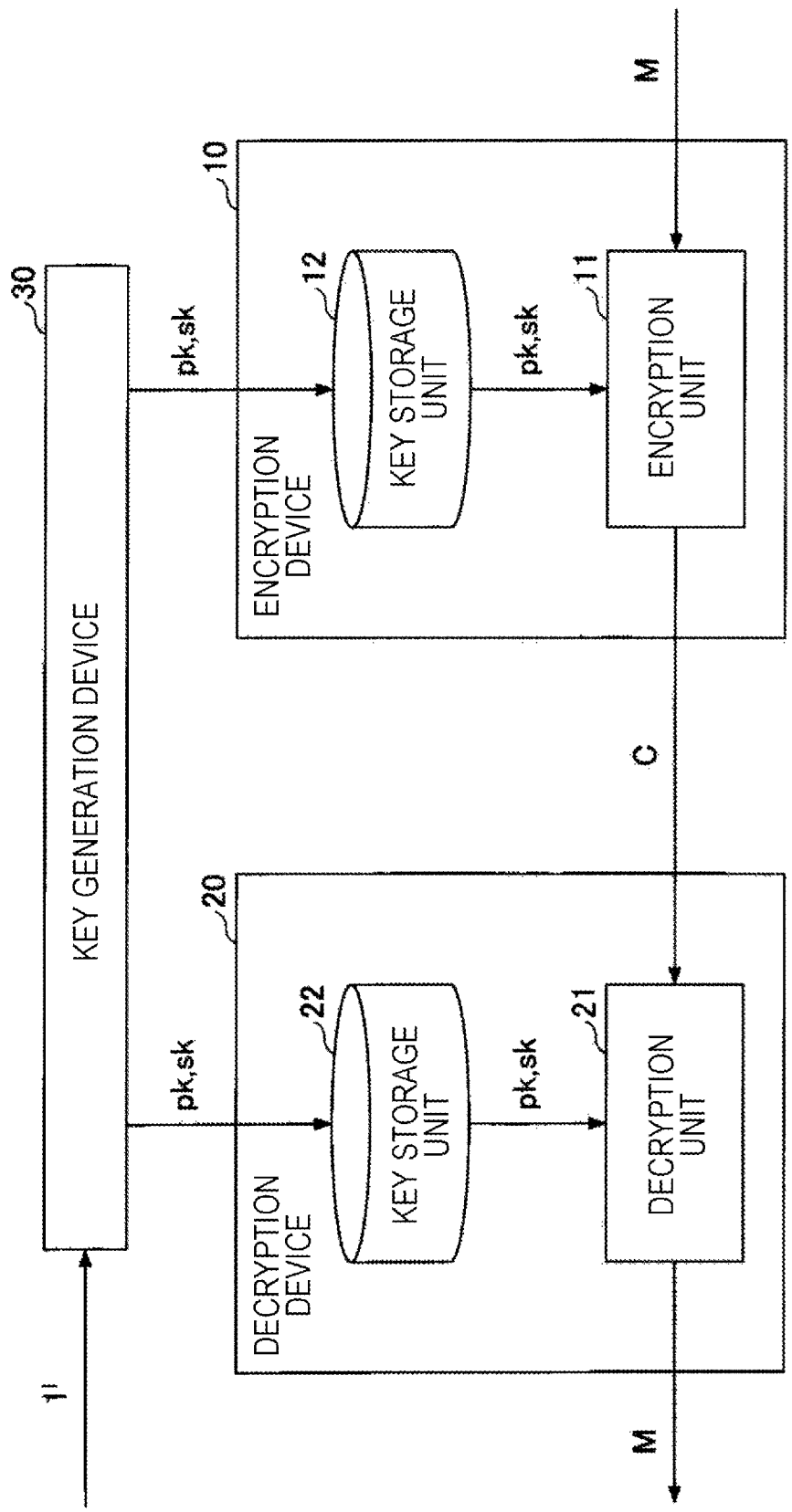
FIG. 3 is a configuration diagram of a cryptographic communication system according to Embodiment 1.

FIG. 3 is a configuration diagram of a cryptographic communication system according to the present embodiment. As illustrated in FIG. 3, a cryptographic communication system 1 (cypher communication system) includes an encryption device 10 (encryption apparatus), a decryption device 20 (decryption apparatus), and a key generation device 30. The encryption device 10, the decryption device 20, and the key generation device 30 are communicably connected to one another via a communication network or the like.

The key generation device 30 receives input of bit length designation data ($1^l$), generates the public key pk and the secret key sk of public key encryption, and transmits the public key pk and the secret key sk to the encryption device 10 and the decryption device 20.

The encryption device 10 includes an encryption unit 11 and a key storage unit 12. The key storage unit 12 stores the public key pk and the secret key sk received from the key generation device 30. The encryption unit 11 generates the ciphertext C by encrypting the input message M using the public key pk and the secret key sk, and transmits the ciphertext C to the decryption device 20.

The decryption device 20 includes a key storage unit 22 and a decryption unit 21. The key storage unit 22 stores the public key pk and the secret key sk received from the key generation device 30. The decryption unit 21 obtains the message M by decrypting the ciphertext C received from the encryption device 10 using the public key pk and the secret key sk.

Figure 4:
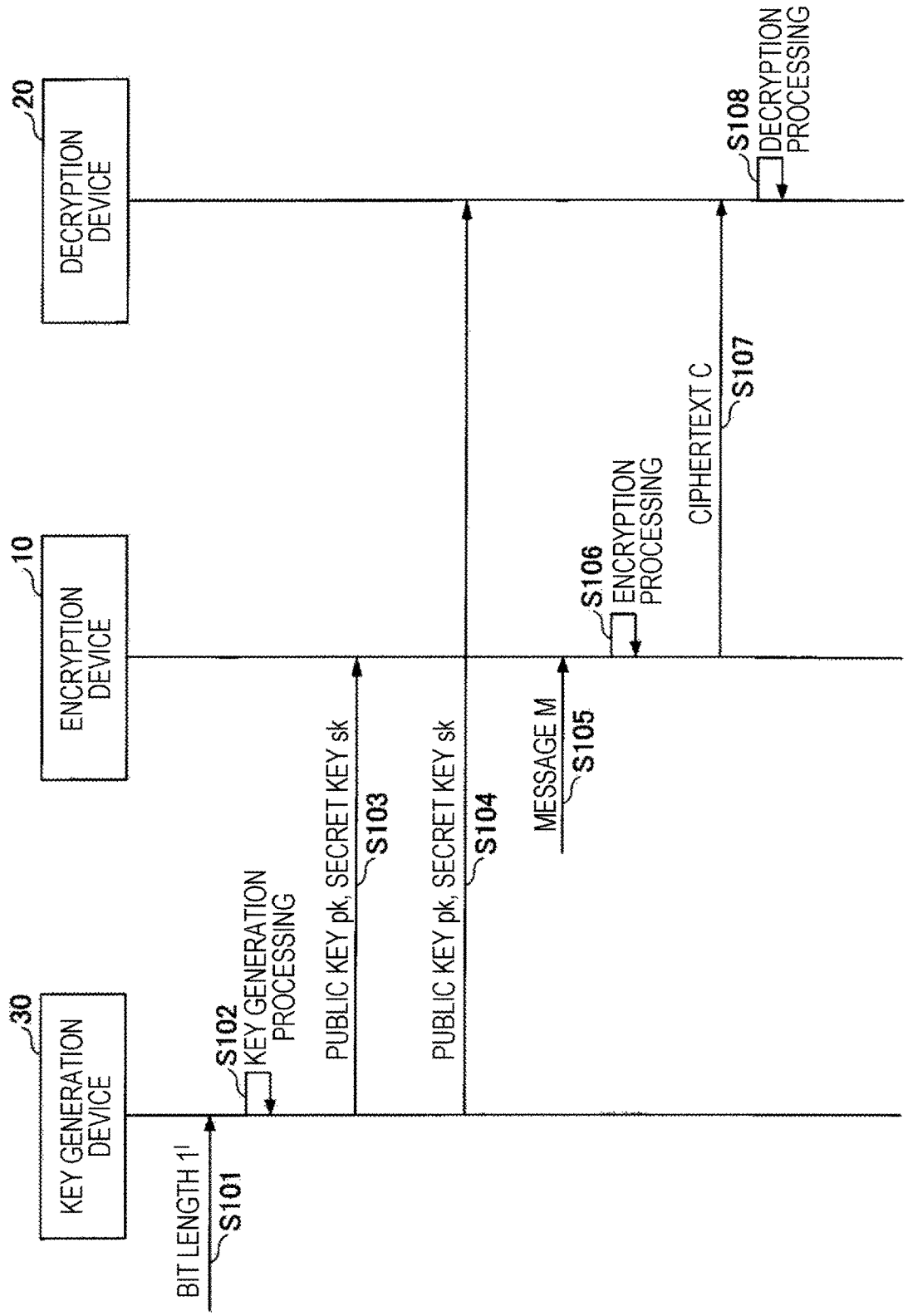
FIG. 4 is a sequence diagram illustrating cryptographic communication processing according to Embodiment 1.

Next, operation of the cryptographic communication system 1 according to the present embodiment will be described. FIG. 4 is a sequence diagram illustrating cryptographic communication processing according to the present embodiment.

The key generation device 30 receives input of bit length designation data ($1^l$) by a user's operation or the like (step S101). Then, the key generation device 30 executes key generation processing of generating a key having the designated bit length (step S102). Specifically, the key generation device 30 generates the public key pk and the secret key sk of public key encryption.

Next, the key generation device 30 transmits the public key pk and the secret key sk to the encryption device 10 (step S103). The key storage unit 12 of the encryption device 10 stores the received public key pk and secret key sk. Similarly, the key generation device 30 transmits the public key pk and the secret key sk to the decryption device 20 (step S104). The key storage unit 22 of the decryption device 20 stores the received public key pk and secret key sk.

The encryption device 10 receives input of the message M by a user's operation or the like (step S105). The encryption unit 11 executes encryption processing (step S106). Specifically, the encryption unit 11 encrypts the message M using the public key pk and the secret key sk stored in the key storage unit 12 to generate the ciphertext C.

The encryption device 10 transmits the ciphertext C to the decryption device 20 (step S107). The decryption unit 21 of the decryption device 20 executes decryption processing (step S108). Specifically, the decryption unit 21 decrypts the ciphertext C using both the public key pk and the secret key sk to obtain the message M.

Hereinafter, some examples will be described regarding details of the processing according to the present embodiment.

Example A of Embodiment 1: RSA Encryption

In Example A, an example of encryption by RSA encryption will be described. RSA encryption is one of public key encryption. The basis of security of RSA encryption is the fact that the prime factorization problem of a combined number having a large number of digits is difficult.

Details of each processing using RSA encryption are as follows.

(i) Key Generation Processing (FIG. 4: Step S102)

When $1^l$ is input, the key generation device 30 outputs a public key pk=(n, e) and a secret key sk=(d, p, q). Here, p and q are prime numbers having bit lengths equivalent to each other. Details of specific processing executed by the key generation device 30 are as follows.

(i-1) Let p and q be prime numbers having equivalent bit lengths, and let n=pq.

(i-2) $\phi(n)=(p-1)(q-1)$.

(i-3) e is a positive integer less than $\phi(n)$ and is coprime with $\phi(n)$. In addition, d is a reciprocal of e obtained by modulo $\phi(n)$. By these numerical value selection methods, $de \equiv 1 \pmod{\phi(n)}$ is established.

(i-4) It is assumed that n and e obtained by the above processing are public keys pk, and that d, p, and q are secret keys sk.

Hereinafter, a set of integers of zero or more and less than n is represented by Zn.

(ii) Encryption Processing (FIG. 4: Step S106)

The message M is an element of Zn.

The encryption unit 11 calculates $C=M^e$ mod n and outputs the ciphertext C.

(iii) Decryption Processing (FIG. 4: Step S108)

The decryption unit 21 performs the following calculation on the ciphertext C to obtain a plaintext message M.

$$M=C^d \bmod n$$

In particular, in (ii) encryption processing, the encryption unit 11 can use the secret key sk=(d, p, g) in addition to the public key pk=(n, e). Then, the encryption unit 11 can replace mod n with a combination of mod p and mod q according to the Chinese remainder theorem. That is, the encryption unit 11 performs a remainder calculation by converting into a divisor with a short bit length according to the Chinese remainder theorem. Therefore, the cost of the calculation can be reduced, and the encryption processing can be speeded up.

Example B of Embodiment 1: Paillier Encryption

In Example B, an example of encryption by Paillier encryption will be described. Paillier encryption is one of public key encryption satisfying a property that a ciphertext of m1+m2 can be calculated from a ciphertext of m1 and a ciphertext of m2 (additive homomorphism).

Details of each processing using Paillier encryption are as follows.

(i) Key Generation Processing (FIG. 4: Step S102)

Details of specific processing executed by the key generation device 30 are as follows.

(i-1) Two large prime numbers p and q are randomly selected, and n=pq.

(i-2) k is arbitrarily selected from Zn, and $g=1+kn \bmod n^2$.

(i-3) It is assumed that the public key pk=(n, g) and the secret key sk=(p, q)

(ii) Encryption Processing (FIG. 4: Step S106)

(ii-1) The encryption unit 11 randomly selects r from $$Z_{n^2}^*$$ [Math. 1]

(ii-2) $C=g^m r^n \bmod n^2$ is the ciphertext.

(iii) Decryption Processing (FIG. 4: Step S108)

(iii-1) $\lambda=\mathrm{lcm}(p-1, q-1)$ (iii-1) The decryption unit 21 calculates $M=L(C^\lambda \bmod n^2)/L(g^\lambda \bmod n^2) \bmod n$, and obtains the original message.

In particular, in (ii) encryption processing, the encryption unit 11 can use the secret key sk=(p, q) and a parameter k generated in the key generation processing, in addition to the public key pk=(n, g). Note that the key generation device 30 may transmit the parameter k to the encryption device 10 together with the public key pk and the secret key sk. Thus, the calculation of mod $n^2$ in (ii-2) can be performed using the Chinese remainder theorem. That is, the encryption unit 11 performs a remainder calculation by converting into a divisor with a short bit length according to the Chinese remainder theorem. Therefore, the cost of the calculation can be reduced, and the encryption processing can be speeded up.

Embodiment 2

Hereinafter, Embodiment 2 will be described with reference to the drawings. Embodiment 2 is different from Embodiment 1 in that an encryption device 10 and a decryption device 20 include a preliminary calculation unit and a preliminary calculation table storage unit. Therefore, in the following description of Embodiment 2, differences from Embodiment 1 will be mainly described, and components having functional configurations similar to those of Embodiment 1 are denoted by the same reference numerals as those used in the description of Embodiment 1, and the description thereof will be omitted.

Figure 5:
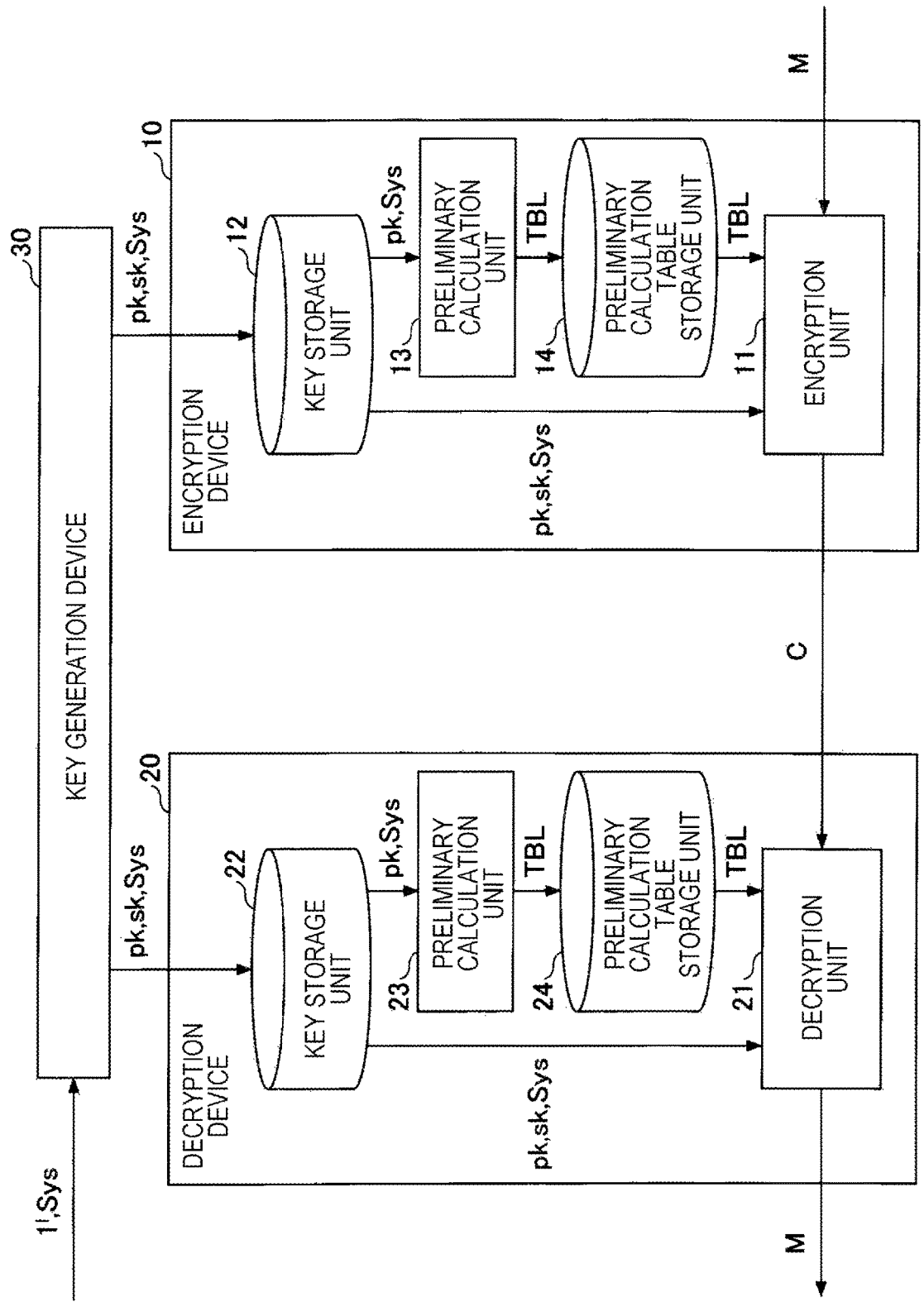
FIG. 5 is a configuration diagram of a cryptographic communication system according to Embodiment 2.

FIG. 5 is a configuration diagram of a cryptographic communication system according to Embodiment 2. A key generation device 30 according to the present embodiment receives input of a system parameter Sys in addition to the bit length designation data ($1_l$), and generates a public key pk and a secret key sk of public key encryption. Then, the key generation device 30 transmits the public key pk, the secret key sk, and the system parameter Sys to the encryption device 10 and the decryption device 20.

The encryption device 10 includes a preliminary calculation unit 13 and a preliminary calculation table storage unit 14 in addition to an encryption unit 11 and a key storage unit 12. The key storage unit 12 stores the public key pk, the secret key sk, and the system parameter Sys received from the key generation device 30.

The preliminary calculation unit 13 performs preliminary calculation. Preliminary calculation is a calculation performed in advance before the encryption processing, and is a calculation that can be performed at a stage where data to be encrypted (message M or the like) is not determined. Specifically, the preliminary calculation unit 13 performs preliminary calculation on the basis of the public key pk and the system parameter Sys, generates a preliminary calculation table TBL, and stores the preliminary calculation table TBL in the preliminary calculation table storage unit 14.

The encryption unit 11 generates a ciphertext C by encrypting an input message M using the system parameter Sys and the preliminary calculation table TBL in addition to the public key pk and the secret key sk, and transmits the generated ciphertext C to the decryption device 20.

Similarly, the decryption device 20 includes a preliminary calculation unit 23 and a preliminary calculation table storage unit 24 in addition to a decryption unit 21 and a key storage unit 22. The key storage unit 22 stores the public key pk, the secret key sk, and the system parameter Sys received from the key generation device 30.

Functions of the preliminary calculation unit 23 and the preliminary calculation table storage unit 24 included in the decryption device 20 are similar to those of the preliminary calculation unit 13 and the preliminary calculation table storage unit 14 included in the encryption device 10.

The decryption unit 21 obtains the message M by decrypting the ciphertext C received from the encryption device 10 using the system parameter Sys and the preliminary calculation table TBL in addition to the public key pk and the secret key sk.

Figure 6:
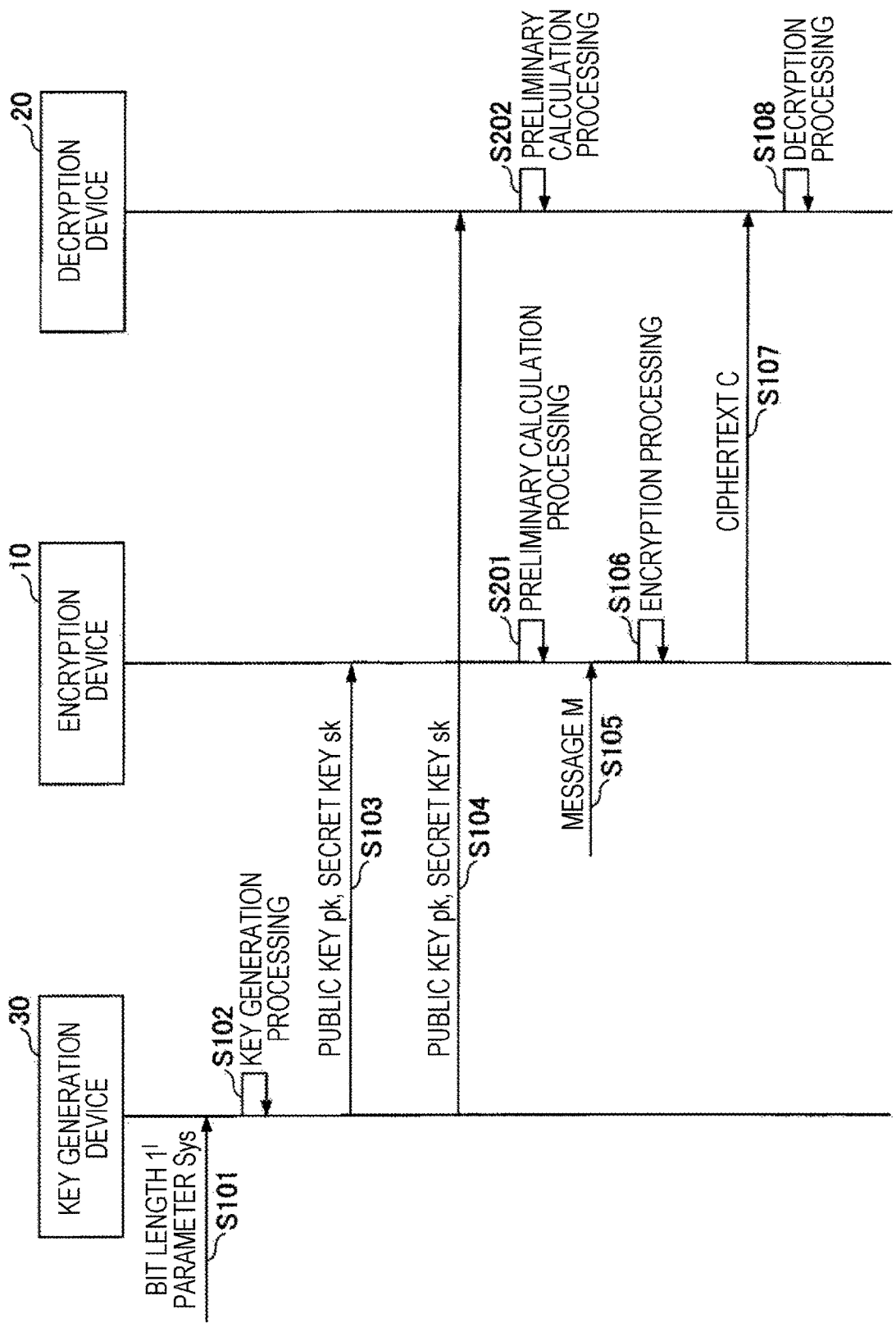
FIG. 6 is a sequence diagram illustrating cryptographic communication processing according to Embodiment 2.

Next, operation of the cryptographic communication system 1 according to the present embodiment will be described. FIG. 6 is a sequence diagram illustrating cryptographic communication processing according to Embodiment 2.

In cryptographic communication processing according to the present embodiment, following step S103, the preliminary calculation unit 13 of the encryption device 10 executes preliminary calculation processing (step S201). Similarly, following step S104, the preliminary calculation unit 23 of the decryption device 20 executes preliminary calculation processing (step S202).

Hereinafter, some examples will be described regarding details of the processing according to the present embodiment.

Example C of Embodiment 2: ElGamal Encryption

In Example C, an example of encryption by ElGamal encryption will be described. ElGamal encryption is one of public key encryption. The basis of security of ElGamal encryption is the fact that the discrete logarithm problem of a group with a large order is difficult.

Details of each processing using ElGamal encryption are as follows.

(i) Key Generation Processing (FIG. 6: Step S102)

When $1^l$ and Sys=$(G_0, G)$ are input, the key generation device 30 outputs the public key pk=$(q, H)$, the secret key sk=$x$, and the system parameter Sys=$(G_0, G)$. Details of specific processing executed by the key generation device 30 are as follows.

(i-1) In a cyclic group G, an order q is a prime number, and the number of bits of q is k.
(i-2) x is randomly selected from $\{0, 1, 2, \ldots, q-1\}$.
(i-3) Let $H = xG_0$.
(i-4) Let $(q, H)$ be the public key pk and x be the secret key sk.

(ii) Preliminary Calculation Processing (FIG. 6: Steps S201 and S202)

The preliminary calculation unit 13 and the preliminary calculation unit 23 generate the preliminary calculation table TBL=$(G_0[0][0], G_0[0][1], G_0[0][2] \ldots G_0[i][j])$ on the basis of pk=$(q, H)$ and Sys=$(G_0, G)$.

(iii) Encryption Processing (FIG. 6: Step S106)

Let an element M of G be a plain text.
The encryption unit 11 executes the following processing.
(iii-1) r is randomly selected from $\{0, 1, 2, \ldots, q-1\}$.
(iii-2) $C1 = rG_0$, $C2 = M + rH$ are calculated.
(iii-3) Let $(C1, C2)$ be the ciphertext.

(iv) Decryption processing (FIG. 6: step S108)

The decryption unit 21 performs the following calculation using the received ciphertext $(C1, C2)$.

$$M = C2 - xC1$$

In the above-described encryption processing and decryption processing, the encryption unit 11 and the decryption unit 21 perform elliptic scalar multiplication with a fixed basis using a fixed-base exponentiation using the preliminary calculation table TBL.

In particular, in (ii) encryption processing, since the secret key sk=$(x)$ can be used in addition to the public key pk=$(q, H)$, the encryption unit 11 can calculate H by $xG_0$. As a result, the preliminary calculation table storage unit 24 does not need to individually have the preliminary calculation table in the elliptic scalar multiplication of H, and can use the preliminary calculation table based on $G_0$.

Since the size of the preliminary calculation table is related to the overall calculation cost, reducing the size of the preliminary calculation table contributes to reduction of the overall calculation cost. Therefore, according to the configuration of Example C, the preliminary calculation table is smaller than that in the conventional technology, the calculation cost can be reduced, and the encryption processing can be speeded up.

Example D of Embodiment 2: KH-PKE

In Example D, an example of encryption by keyed-homomorphic public-key encryption (KH-PKE) will be described. KH-PKE is an encryption method published in reference [1] below.

Reference of Example D

[1] Emura, K., Hanaoka, G., Nuida, K. et al. Chosen ciphertext secure keyed-homomorphic public-key cryptosystems. Des. Codes Cryptogr. 86, 1623-1683 (2018). https://doi.org/10.1007/s10623-017-0417-6

Details of each processing using KH-PKE are as follows.

(i) Key Generation Processing (FIG. 6: Step S102)

When $1^l$ and Sys=$(G_0, G_1, G)$ are input, the key generation device 30 generates the public key pk=S and the secret key.

$$sk_d = (k_0, k_1), (\hat{k}_0, \hat{k}_1), (\tilde{k}_{0,0}, \tilde{k}_{0,1}, \tilde{k}_{1,0}, \tilde{k}_{1,1}) \qquad [\text{Math. 2}]$$

is generated.

(ii) Preliminary Calculation Processing (FIG. 6: Steps S201 and S202)

The preliminary calculation unit 13 and the preliminary calculation unit 23 generate the preliminary calculation table TBL=$((G_0[0][0], G_0[0][1], G_0[0][2] \ldots G_0[i][j]), (G_1[0][0], G_1[0][1], G_1[0][2] \ldots G_1[i][j]), (S[0][0], S[0][1], S[0][2] \ldots S[i][j]))$ on the basis of pk=S and Sys=$(G_0, G_1, G)$.

(iii) Encryption Processing (FIG. 6: Step S106)

The encryption unit 11 executes processing defined in the following encryption algorithm on the message M using the preliminary calculation table TBL to obtain the ciphertext C.

$$X_0 \leftarrow \omega G_0$$

$$X_1 \leftarrow \omega G_1$$

$$\Pi \leftarrow \omega S$$

$$E \leftarrow M + \Pi$$

$$\gamma \leftarrow TCR_1(X_0, X_1, E)$$

$$\hat{\Pi} \leftarrow \{\omega(k'_0 + \gamma \hat{k}_{1,0})G_0 + \omega(k'_1 + \gamma \hat{k}_{1,1})G_1\}$$

$$\tilde{\Pi} \leftarrow \{\omega(\tilde{k}'_0 + \gamma \tilde{k}_{1,0})G_0 + \omega(\tilde{k}_1 + \gamma \tilde{k}_{1,1})G_1\}$$

$$\tau \leftarrow TCR_2(\tilde{\Pi})$$

$$C \leftarrow (X_0, X_1, E, \hat{\Pi}, \tau) \qquad [\text{Math. 3}]$$

(iv) Decryption Processing (FIG. 6: Step S108)

The decryption unit 21 obtains the message M by decrypting the ciphertext C using the preliminary calculation table TBL.

For comparison, a conventional method will be described. In the conventional KH-PKE, since the secret key sk is not used in the encryption processing, the following is used as the preliminary calculation table TBL.

$$G_0[0][0], G_0[0][1], G_0[0][2] \ldots G_0[i][j]$$

$$G_1[0][0], G_1[0][1], G_1[0][2] \ldots G_1[i][j]$$

$$S[0][0], S[0][1], S[0][2] \ldots S[i][j]$$

$$S'[0][0], S'[0][1], S'[0][2] \ldots S'[i][j]$$

$$\hat{S}[0][0], \hat{S}[0][1], \hat{S}[0][2] \ldots \hat{S}[i][j]$$

$$\tilde{S}[0][0], \tilde{S}[0][1], \tilde{S}[0][2] \ldots \tilde{S}[i][j]$$

$$\tilde{S}_1[0][0], \tilde{S}_1[0][1], \tilde{S}_1[0][2] \ldots \tilde{S}_1[i][j] \qquad [\text{Math. 4}]$$

Then, in the encryption processing, processing defined in the following encryption algorithm is executed on the message M using the preliminary calculation table TBL to obtain the ciphertext C.

$$X_0 \leftarrow \omega G_0$$

$$X_1 \leftarrow \omega G_1$$

$$\Pi \leftarrow \omega S$$

$$E \leftarrow M + \Pi$$

$$\gamma \leftarrow TCR_1(X_0, X_1, E)$$

$$\hat{\Pi} \leftarrow \omega(S' + \gamma \tilde{S})$$

$$\check{\Pi} \leftarrow \omega(\tilde{S} + \gamma \tilde{S}_1)$$

$$\tau \leftarrow TCR_2(\check{\Pi})$$

$$C \leftarrow (X_0, X_1, E, \hat{\Pi}, \tau) \qquad \text{[Math. 5]}$$

According to the method of Example D described above, the size of the preliminary calculation table in KH-PKE can be reduced by 50% or more as compared with the conventional method. Since the size of the preliminary calculation table is related to the overall calculation cost, reducing the size of the preliminary calculation table contributes to reduction of the overall calculation cost. Therefore, according to the configuration of Example D, the preliminary calculation table is reduced, the calculation cost can be reduced, and the encryption processing can be speeded up.

Embodiment 3

Hereinafter, Embodiment 3 will be described with reference to the drawings. Embodiment 3 is different from Embodiment 2 in further including a preliminary calculation device. Therefore, in the following description of Embodiment 3, differences from Embodiment 2 will be mainly described, and components having functional configurations similar to those of Embodiment 2 are denoted by the same reference numerals as those used in the description of Embodiment 2, and the description thereof will be omitted.

Figure 7:
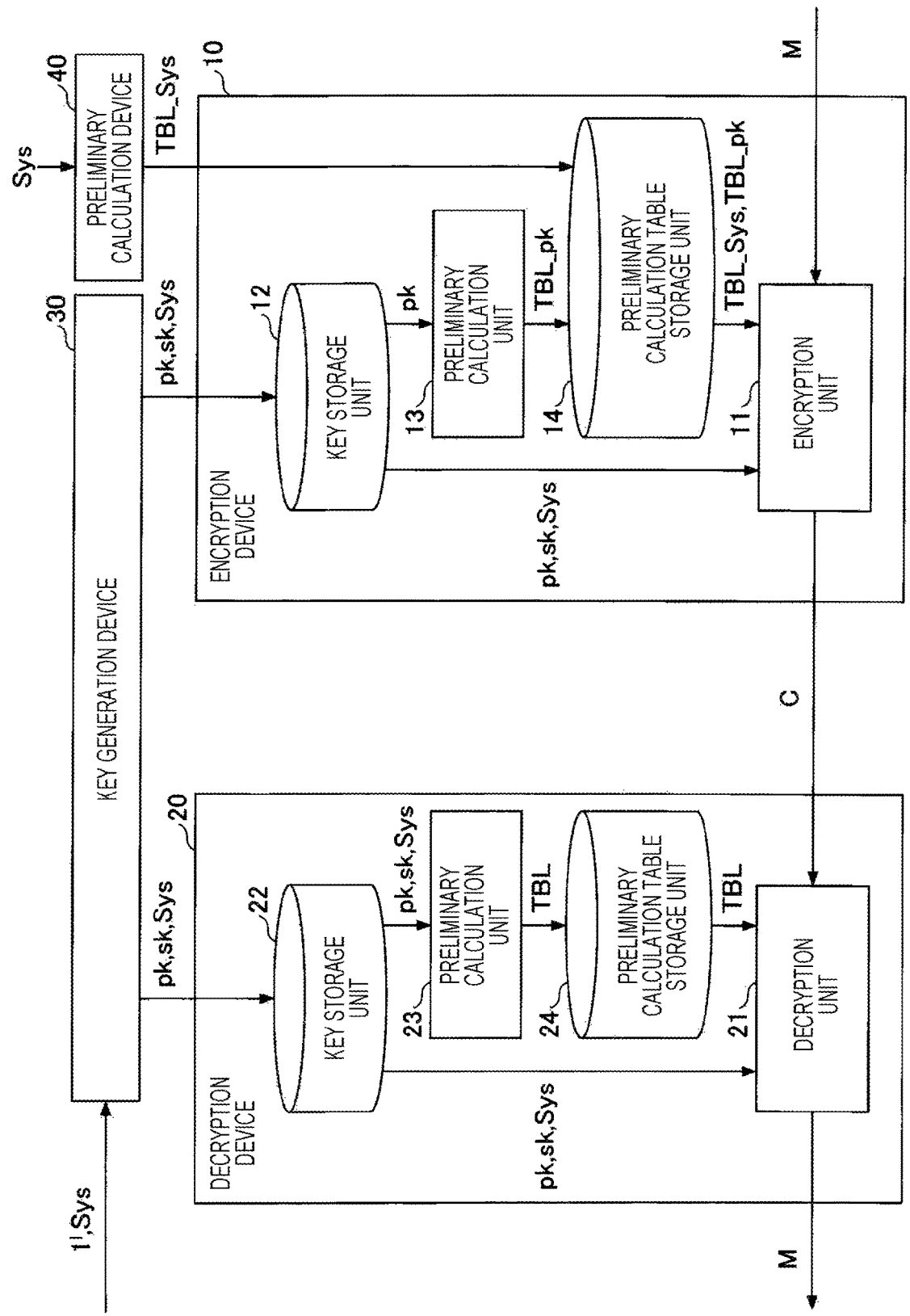
FIG. 7 is a configuration diagram of a cryptographic communication system according to Embodiment 3.

FIG. 7 is a configuration diagram of a cryptographic communication system according to Embodiment 3. A cryptographic communication system 1 according to the present embodiment further includes a preliminary calculation device 40 in addition to the devices according to Embodiment 2.

Upon receiving input of a system parameter Sys, the preliminary calculation device 40 generates a preliminary calculation table TBL_Sys and transmits the table to an encryption device 10.

A preliminary calculation unit 13 of the encryption device 10 generates a preliminary calculation table TBL_pk based on a public key pk. A preliminary calculation table storage unit 14 stores TBL_Sys and TBL_pk.

An encryption unit 11 generates a ciphertext C by encrypting a message M on the basis of pk, sk, and Sys stored in a key storage unit 12 and TBL_Sys and TBL_pk stored in the preliminary calculation table storage unit 14.

Figure 8:
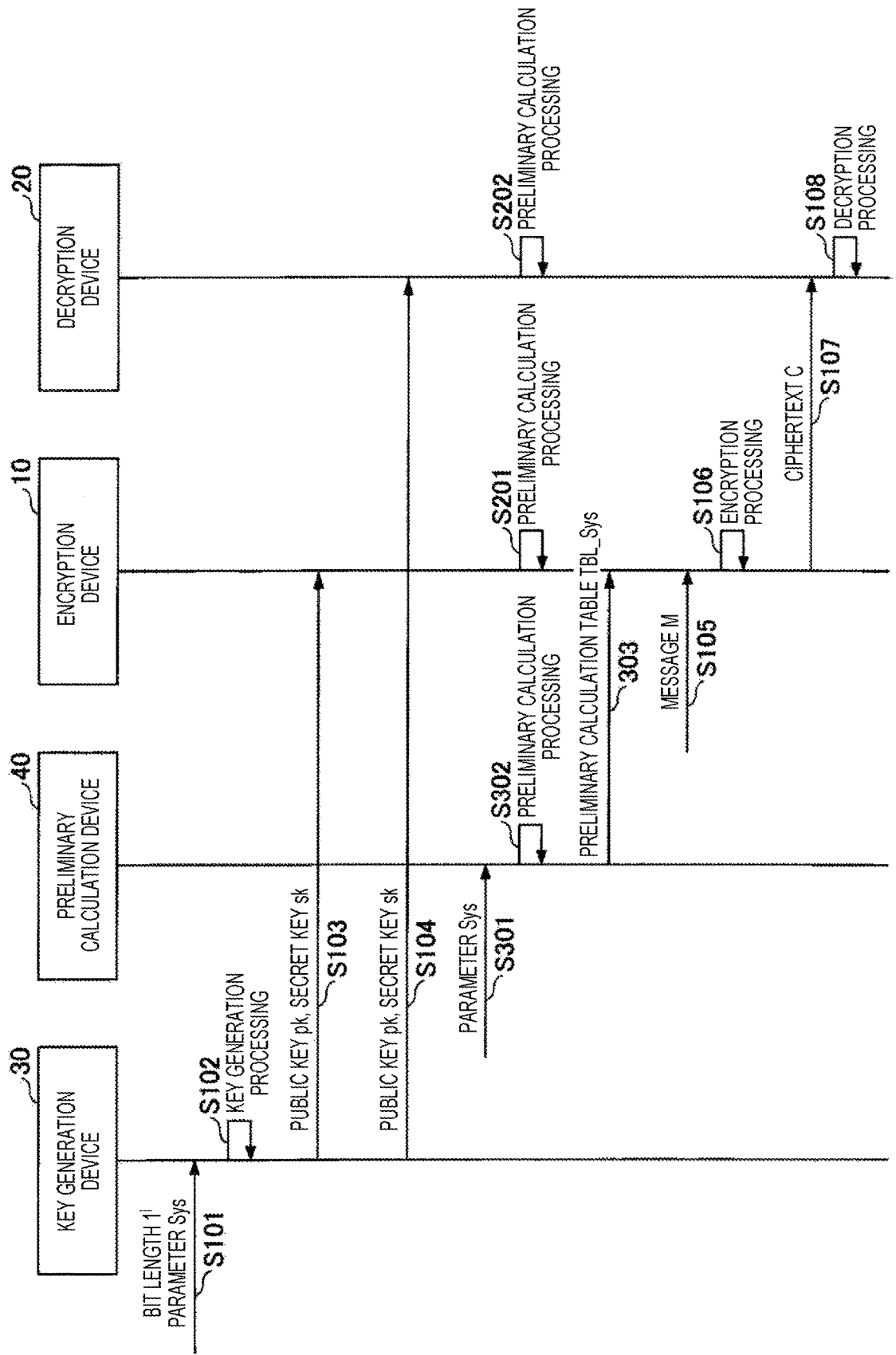
FIG. 8 is a sequence diagram illustrating cryptographic communication processing according to Embodiment 3.

Next, operation of the cryptographic communication system 1 according to the present embodiment will be described. FIG. 8 is a sequence diagram illustrating cryptographic communication processing according to Embodiment 3.

In cryptographic communication processing according to the present embodiment, the preliminary calculation device 40 receives input of the system parameter Sys (step S301), and executes preliminary calculation processing (step S302). Then, the preliminary calculation device 40 transmits the generated preliminary calculation table TBL_Sys to the encryption device 10 (step S303).

Furthermore, in preliminary calculation processing in step S201, the preliminary calculation unit 13 generates the preliminary calculation table TBL_pk based on the public key pk.

Example E of Embodiment 3: KH-PKE

In Example E, an example of encryption by KH-PKE in the present embodiment will be described.

(i) Preliminary Calculation Processing (FIG. 8: Step S201)

The preliminary calculation unit 13 generates the preliminary calculation table TBL_pk=(S[0][0], S[0][1], S[0][2] ... S[i][j]) on the basis of pk=S. is generated.

(ii) Preliminary Calculation Processing (FIG. 8: Step S302)

The preliminary calculation device 40 generates the preliminary calculation table TBL_Sys=(($G_0$[0][0], $G_0$[0][1], $G_0$[0][2] ... $G_0$[i][j]), ($G_1$[0][0], $G_1$[0][1] $G_1$[0][2] ... $G_1$[i][j])) on the basis of Sys=($G_0$, $G_1$, G).

(iii) Encryption Processing (FIG. 8: Step S106)

The encryption unit 11 executes processing similar to the encryption algorithm according to Embodiment 2 on the message M to obtain the ciphertext C.

According to the cryptographic communication system 1 of the present embodiment, since the encryption device 10 does not perform the preliminary calculation based on the system parameter Sys, the amount of preliminary calculation can be smaller than that in Embodiment 2. Therefore, the calculation cost of the encryption device 10 can be further reduced as compared with Embodiment 2, and the encryption processing can be speeded up even more.

Embodiment 4

Hereinafter, Embodiment 4 of the present invention will be described with reference to the drawings. Embodiment 4 is different from Embodiment 3 in that an encryption device 10 does not include a preliminary calculation unit. Therefore, in the following description of Embodiment 4, differences from Embodiment 3 will be mainly described, and components having functional configurations similar to those of Embodiment 3 are denoted by the same reference numerals as those used in the description of Embodiment 3, and the description thereof will be omitted.

Figure 9:
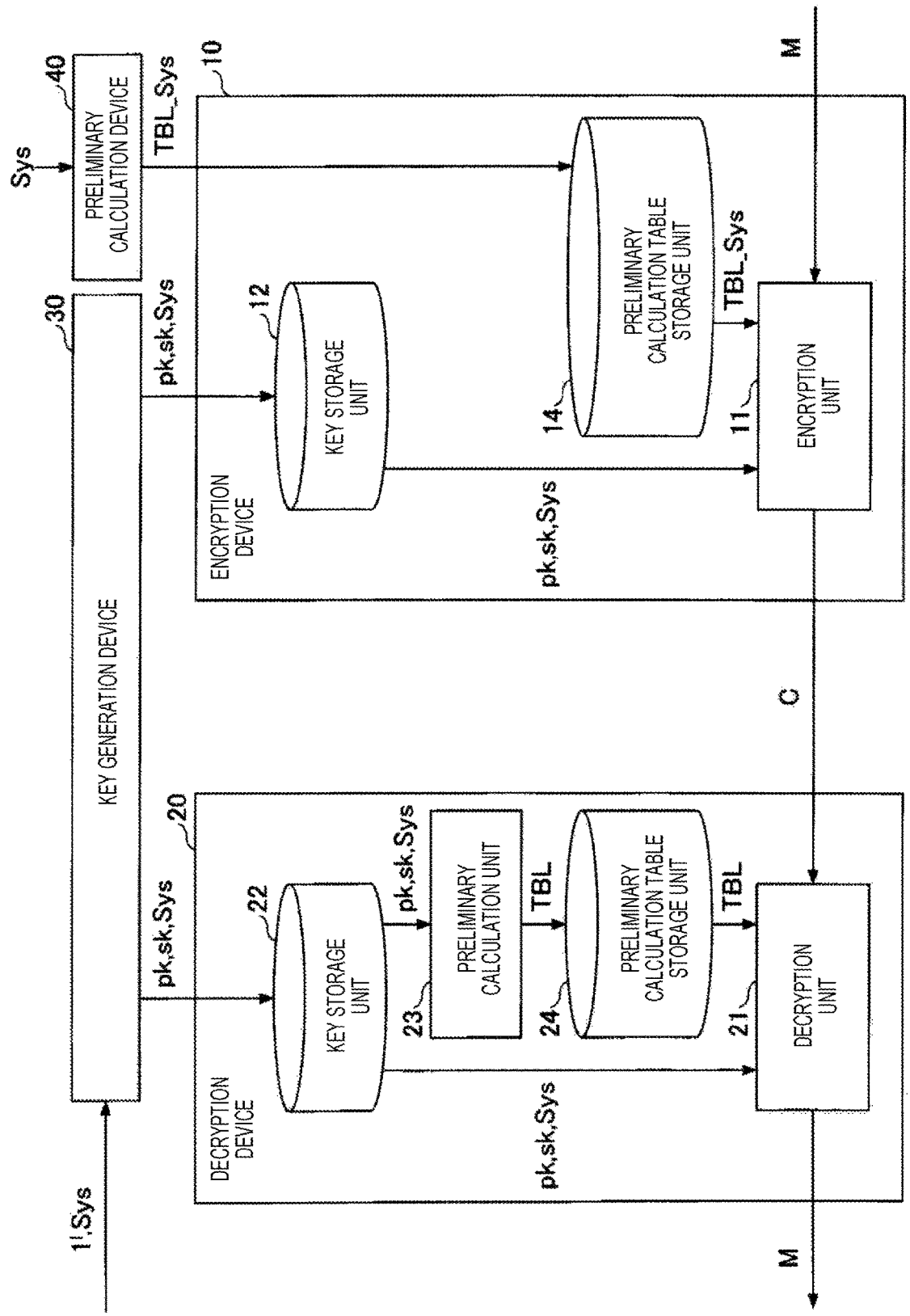
FIG. 9 is a configuration diagram of a cryptographic communication system according to Embodiment 4.

FIG. 9 is a configuration diagram of a cryptographic communication system according to Embodiment 4. The encryption device 10 according to the present embodiment does not include the preliminary calculation unit 13 according to Embodiment 3. Therefore, a preliminary calculation table storage unit 14 stores a preliminary calculation table TBL_Sys based on a system parameter Sys. That is, the preliminary calculation table storage unit 14 does not store a preliminary calculation table TBL_pk based on a public key pk).

An encryption unit 11 generates a ciphertext C by encrypting a message M on the basis of pk, sk, and Sys stored in a key storage unit 12 and TBL_Sys stored in the preliminary calculation table storage unit 14.

Figure 10:
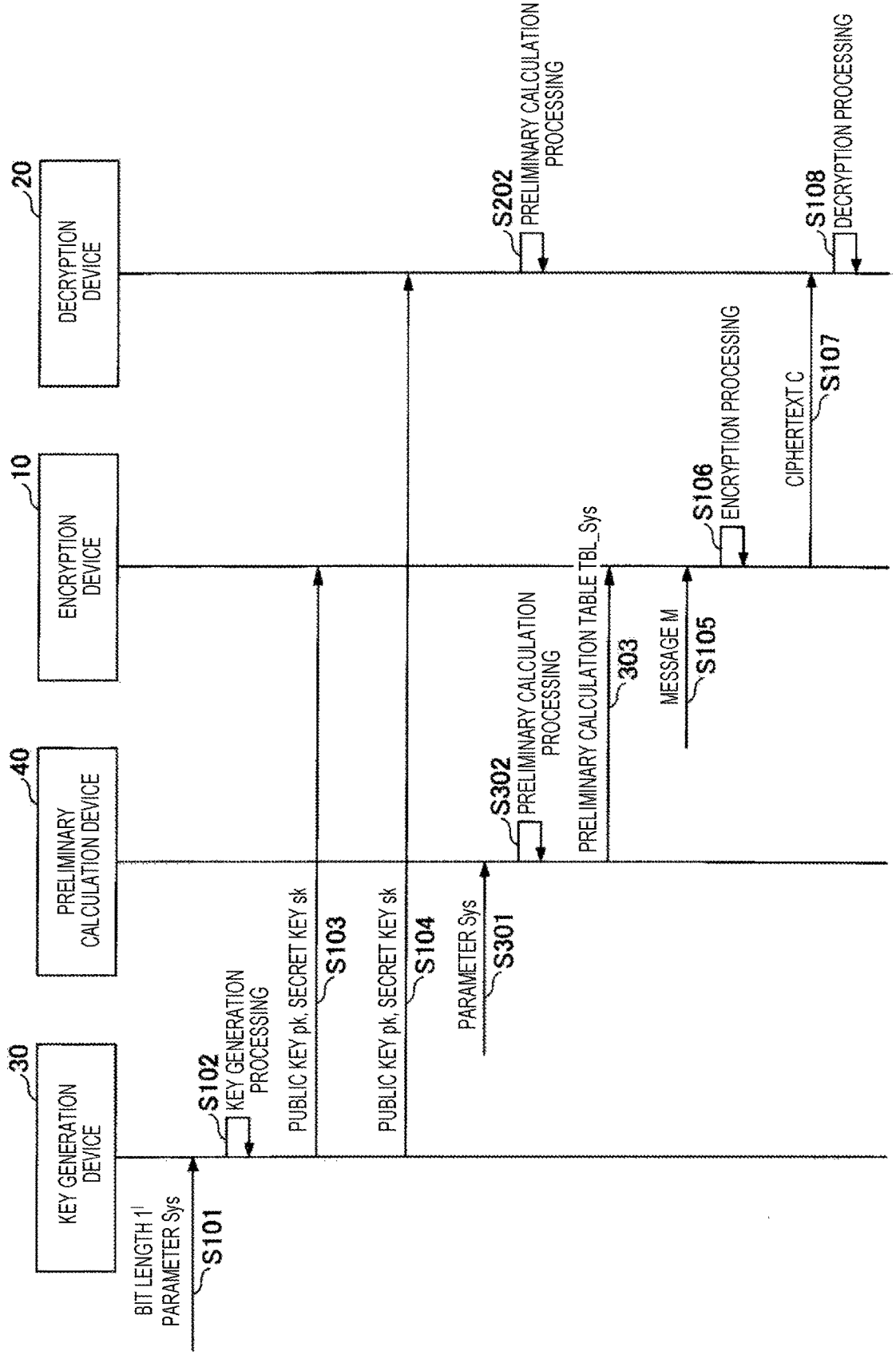
FIG. 10 is a sequence diagram illustrating cryptographic communication processing according to Embodiment 4.

Next, operation of the cryptographic communication system 1 according to the present embodiment will be described. FIG. 10 is a sequence diagram illustrating cryptographic communication processing according to Embodiment 4.

In cryptographic communication processing according to the present embodiment, the encryption device 10 does not execute preliminary calculation processing (processing corresponding to step S201 in FIG. 8 does not exist in FIG. 10).

Example F of Embodiment 4: ElGamal Encryption

In Example F, an example of encryption by ElGamal encryption in the present embodiment will be described. Details of each processing using ElGamal encryption are as follows.
(ii) Preliminary Calculation Processing (FIG. 10: Step S302)

A preliminary calculation device 40 generates a preliminary calculation table TBL=($G_0[0][0]$, $G_0[0][1]$, $G_0[0][2]$ . . . $G_0[i][j]$) on the basis of Sys=($G_0$, G).

Since the encryption unit 11 in the ElGamal encryption performs encryption using sk, it is sufficient to use the preliminary calculation table TBL=($G_0[0][0]$, $G_0[0][1]$, $G_0[0][2]$ . . . $G_0[i][j]$) based on the system parameter Sys=($G_0$, G). As a result, the encryption device 10 can be configured not to perform preliminary calculation processing.

Example G of Embodiment 4: KH-PKE (i) Preliminary Calculation Processing (FIG. 10: Step S302)

The preliminary calculation device 40 generates the preliminary calculation table TBL_Sys=(($G_0[0][0]$, $G_0[0][1]$, $G_0[0][2]$ . . . $G_0[i][j]$), ($G_1[0][0]$, $G_1[0][1]$, $G_1[0][2]$ . . . $G_1[i][j]$)) on the basis of Sys=($G_0$, $G_1$, G).
(iii) Encryption Processing (FIG. 8: Step S106)

The encryption unit 11 executes processing defined in the following encryption algorithm on the message M to obtain the ciphertext C.

$$X_0 \leftarrow \omega G_0$$

$$X_1 \leftarrow \omega G_1$$

$$\Pi \leftarrow k_0 \omega G_0 + k_1 \omega G_1$$

$$E \leftarrow M + \Pi$$

$$\gamma \leftarrow TCR_1(X_0, X_1, E)$$

$$\hat{\Pi} \leftarrow \{\omega(k'_0 + \gamma \hat{k}_{1,0})G_0 + \omega(k'_1 + \gamma \hat{k}_{1,1})G_1\}$$

$$\tilde{\Pi} \leftarrow \{\omega(\tilde{k}_0 + \gamma \tilde{k}_{1,0})G_0 + \omega(\tilde{k}_1 + \gamma \tilde{k}_{1,1})G_1\}$$

$$\tau \leftarrow TCR_2(\tilde{\Pi})$$

$$C \leftarrow (X_0, X_1, E, \hat{\Pi}, \tau) \quad [\text{Math. 6}]$$

According to this encryption algorithm, the encryption unit 11 can perform encryption using the preliminary calculation table TBL_Sys=(($G_0[0][0]$, $G_0[0][1]$, $G_0[0][2]$ . . . $G_0[i][]$), ($G_1[0][0]$, $G_1[0][1]$, $G_1[0][2]$ . . . $G_1[i][j]$)) based on the system parameter Sys=($G_0$, $G_1$, G). As a result, the encryption device 10 can be configured not to perform preliminary calculation processing.

According to the methods of Example F and Example G described above, since the encryption device 10 does not perform preliminary calculation processing, the calculation cost by the encryption device 10 can be further reduced. Note that in the configuration of Embodiment 4, when compared with the configuration of Embodiment 3, the load of encryption processing increases while the load of preliminary calculation decreases. Therefore, when the cryptographic communication system 1 is constructed, a more appropriate configuration can be obtained by selecting one of the forms in consideration of the trade-off between the two.

(Hardware Configuration Example)

The encryption device 10, the decryption device 20, the key generation device 30, and the preliminary calculation device 40 (collectively referred to as "device") can all be implemented by, for example, causing a computer to execute a program describing processing contents described in the present embodiment. Note that "computer" may be a physical machine or a virtual machine on a cloud. In a case where a virtual machine is used, "hardware" described herein is virtual hardware.

The above program can be stored and distributed by being recorded in a computer-readable recording medium (portable memory or the like). Furthermore, the above program can also be provided through a network such as the Internet or email.

FIG. 11 is a diagram illustrating a hardware configuration example of the computer. The computer in FIG. 11 includes a drive device 1000, an auxiliary storage device 1002, a memory device 1003, a central processing unit (CPU) 1004, an interface device 1005, a display device 1006, an input device 1007, an output device 1008, and the like which are connected to each other by a bus B.

The program for implementing the processing in the computer is provided by, for example, a recording medium 1001 such as a CD-ROM or a memory card. When the recording medium 1001 that stores the program is set in the drive device 1000, the program is installed from the recording medium 1001 to the auxiliary storage device 1002 via the drive device 1000. Note, however, that the program is not necessarily installed from the recording medium 1001, and may be downloaded from another computer via a network. The auxiliary storage device 1002 stores the installed program and also stores necessary files, data, and the like.

In a case where an instruction to start the program is given, the memory device 1003 reads and stores the program from the auxiliary storage device 1002. The CPU 1004 implements a function related to the device in accordance with a program stored in the memory device 1003. The interface device 1005 is used as an interface for connecting to the network. The display device 1006 displays a graphical user interface (GUI) or the like by the program. The input device 1007 includes a keyboard and mouse, buttons, a touch panel, or the like, and is used to input various operation instructions. The output device 1008 outputs a calculation result.

In each of the above-described embodiments, an example has been described in which the key generation device 30 generates the public key pk and the secret key sk. However, the scope of the present invention is not limited to this, and the encryption device 10 or the decryption device 20 may generate the public key pk and the secret key sk.

Summary of Embodiment

In the present specification, at least the encryption device, the cryptographic communication system, the encryption method, and the program described in the following clauses are described.
(Clause 1)

An encryption apparatus including
a key storage unit that stores a secret key and a public key of public key encryption, and an encryption unit that encrypts communication data using the secret key and the public key.

(Clause 2)

The encryption apparatus according to clause 1, in which the encryption unit encrypts the communication data using a preliminary calculation table generated by a device different from the encryption apparatus.

(Clause 3)

The encryption apparatus according to clause 2, in which the encryption unit encrypts the communication data by ElGamal encryption or KH-PKE.

(Clause 4)

The encryption apparatus according to any one of clauses 1 to 3, in which the encryption unit performs a remainder calculation by converting into a divisor with a short bit length according to a Chinese remainder theorem.

(Clause 5)

The encryption apparatus according to clause 4, in which the encryption unit encrypts the communication data by RSA encryption or Paillier encryption.

(Clause 6)

A cypher communication system including an encryption apparatus and a decryption apparatus that perform cryptographic communication with each other, in which:

the encryption apparatus includes
a key storage unit that stores a secret key and a public key of public key encryption, and
an encryption unit that encrypts communication data using the secret key and the public key; and
the decryption apparatus includes
a key storage unit that stores the secret key and the public key, and
a decryption unit that decrypts communication data encrypted by the encryption apparatus using the secret key.

(Clause 7)

An encryption method executed by an encryption apparatus that stores a secret key and a public key of public key encryption, the method including
encrypting communication data using the secret key and the public key.

(Clause 8)

A program for causing a computer to function as each unit in the encryption apparatus according to any one of clauses 1 to 5.

While the embodiments have been described above, the present invention is not limited to such specific embodiments, and various modifications and changes can be made within the scope of the gist of the present invention described in the claims.

REFERENCE SIGNS LIST

1 Cryptographic communication system
10 Encryption device
11 Encryption unit
12 Key storage unit
13 Preliminary calculation unit
14 Preliminary calculation table storage unit
20 Decryption device
21 Decryption unit
22 Key storage unit
23 Preliminary calculation unit
24 Preliminary calculation table storage unit
30 Key generation device
40 Preliminary calculation device

The invention claimed is:

1. An encryption apparatus comprising:
a memory; and
a processor configured to execute:
storing a secret key and a public key of public key encryption, and
encrypting communication data by using the secret key and the public key,
wherein the encrypting includes encrypting the communication data by using a preliminary calculation table generated by a device different from the encryption apparatus, said device different from the encryption apparatus being connected with the encryption apparatus via network, said encrypting includes encrypting the communication data by KH-PKE, and
wherein the processor is configured to encrypt the communication data using a preliminary calculation table that includes a plurality of values that are preliminarily generated based on a system parameter corresponding to another apparatus that communicates with the encryption apparatus.

2. The encryption apparatus according to claim 1, wherein the encrypting includes performing a remainder calculation by converting into a divisor with a short bit length according to a Chinese remainder theorem.

3. The encryption apparatus according to claim 2, wherein the encrypting includes encrypting the communication data by RSA encryption or Paillier encryption.

4. A non-transitory computer-readable recording medium having computer-readable instructions stored thereon, which when executed, cause a computer to function as each unit in the encryption apparatus according to claim 1.

5. The encryption apparatus according to claim 1, wherein the processor is further configured to receive the preliminary calculation table from the device via the network.

6. A cypher communication system comprising an encryption apparatus and a decryption apparatus that perform cryptographic communication with each other, wherein:

the encryption apparatus includes
a first memory; and
a first processor configured to execute:
storing a secret key and a public key of public key encryption, and
encrypting communication data by using the secret key and the public key,
wherein the encrypting includes encrypting the communication data by using a preliminary calculation table generated by a device different from the encryption apparatus, said device different from the encryption apparatus being connected with the encryption apparatus via network, said encrypting includes encrypting the communication data by KH-PKE, and
wherein the first processor is configured to encrypt the communication data using a preliminary calculation table that includes a plurality of values that are preliminarily generated based on a system parameter corresponding to the decryption apparatus; and
the decryption device includes
a second memory; and
a second processor configured to execute:
storing the secret key and the public key, and
decrypting communication data encrypted by the encryption apparatus by using the secret key.

7. An encryption method executed by a computer in an encryption apparatus that stores a secret key and a public key of public key encryption, the method comprising encrypting communication data by using the secret key and the public key, wherein the encrypting includes encrypting the communication data by using a preliminary calculation table generated by a device different from the encryption apparatus, said device different from the encryption apparatus being connected with the encryption apparatus via network, said encrypting includes encrypting the communication data by KH-PKE, and wherein the method further comprises encrypting the communication data using a preliminary calculation table that includes a plurality of values that are preliminarily generated based on a system parameter corresponding to another apparatus that communicates with the encryption apparatus.

* * * * *